June 7, 1966 NOBUTOSHI KIHARA 3,255,303

COLOR TELEVISION RECORDING AND REPRODUCING SYSTEM

Original Filed March 2, 1961 2 Sheets-Sheet 1

Inventor
Nobutoshi Kihara
by Hill, Sherman, Meroni, Gross & Simpson
Attys.

COLOR TELEVISION RECORDING AND REPRODUCING SYSTEM

Original Filed March 2, 1961 2 Sheets-Sheet 2

Inventor
Nobutoshi Kihara
by Hill, Sherman, Meroni, Gross & Simpson
Attys.

3,255,303
COLOR TELEVISION RECORDING AND REPRODUCING SYSTEM

Nobutoshi Kihara, Tokyo, Japan, assignor to Sony Corporation, Tokyo, Japan, a corporation of Japan Continuation of application Ser. No. 92,859, Mar. 2, 1961. This application June 15, 1964, Ser. No. 375,159
Claims priority, application Japan, Mar. 7, 1960, 35/7,638
8 Claims. (Cl. 178—5.2)

This invention relates to a television signal transmission system and more particularly to a system using magnetic tape recording and reproducing apparatus for recording and reproducing color television signals. The system of this invention has extremely low color aberration, has minimum band width requirements in signal transmission channels thereof and yet is comparatively simple and very reliable in operation.

This application is a continuation of a copending application, Serial No. 92,859, filed March 2, 1961, now abandoned.

The invention was evolved with the general object of overcoming difficulties which have been encountered in attempting to record and reproduce color television signals of the type approved by the National Television System Committee and the Federal Communications Commission. Such signals include a luminance signal, generally designated as a "Y" signal, which may be used alone and directly in black and white reproduction, and a phase-amplitude-modulated subcarrier chrominance signal added to the luminance signal. The carrier-chrominance signal consists of two component signals, usually designated as "I" and "O" signals, which have a phase difference of 90° with respect to each other. To permit proper demodulation of the carrier-chrominance signals, a burst of a 3.58 mc. subcarrier signal is transmitted following each horizontal synchronizing pulse, on the "back porch" of the horizontal blanking pedestal. The burst is used to synchronize an oscillator in the receiver.

Various difficulties are encountered in recording and reproducing a composite color signal of this type. In particular, due to unavoidable variations in the speed of movement of the magnetic tape, the carrier-chrominance, luminance and synchronizing signals may be delayed with respect to one another to produce a "jitter" effect and severe color aberration. In addition, an extremely broad frequency band width is required, producing additional troubles.

With the system of this invention, the "jitter" of the recording or reproducing head and recording medium does not cause color aberration and in addition, the required band width in the transmission channels is greatly reduced. At the same time, however, the system is readily usable with camera and reproducing systems designed for signals of the type approved by the National Television System Committee and the Federal Communications Commission, and maintains the compatibility characteristics of such systems. It is however noted that many features of the invention are not limited to use in conjunction with such approved signals, and many features are not limited to use in conjunction with a magnetic tape recording or reproducing system, and can be used in conjunction with other types of signal transmission means.

According to this invention, a single video signal is transmitted in the form of a set of component signals produced cyclically in line-sequential staggered relation at a submultiple of the line rate, and such component signals correspond to a set of component signals generated simultaneously in accordance with the scanning of an image area. Such simultaneously generated component signals may preferably comprise a luminance or Y signal and chrominance signals I and Q such as used in the approved systems discussed above. Such Y, I and Q signals may be generated through a matrix circuit from color signals (red, green and blue) from a color camera, and they may be converted through a matrix circuit into similar color signals for reproduction.

According to an important feature of the invention, the transmitted video signal is in the form of a set of two component signals produced cyclically in line-sequential staggered relation at one-half the line rate. One of such two component signals is divided in effect into lower and upper frequency portions which respectively correspond to two of three simultaneously generated component signals, preferably the I and Q signals of an approved system. The other of the two line-sequential signals corresponds to the third simultaneously generated signal, preferably the luminance or Y signal of an approved system. This arrangement permits maximum use of the band width of a signal transmission channel, or conversely, permits high resolution with minimum band width requirements.

It is an important feature of the invention that the video signal can be produced very simply and reliably through a switching circuit arrangement and in the reproducing portion of the system, the video signal can be readily converted into proper signals for reproduction, through a comparatively simple and very reliable delay and switching system.

These and other objects, features and advantages of the invention will become more fully apparent from the following detailed description taken in conjunction with the accompanying drawings which illustrate a preferred embodiment and in which.

Figure 1:
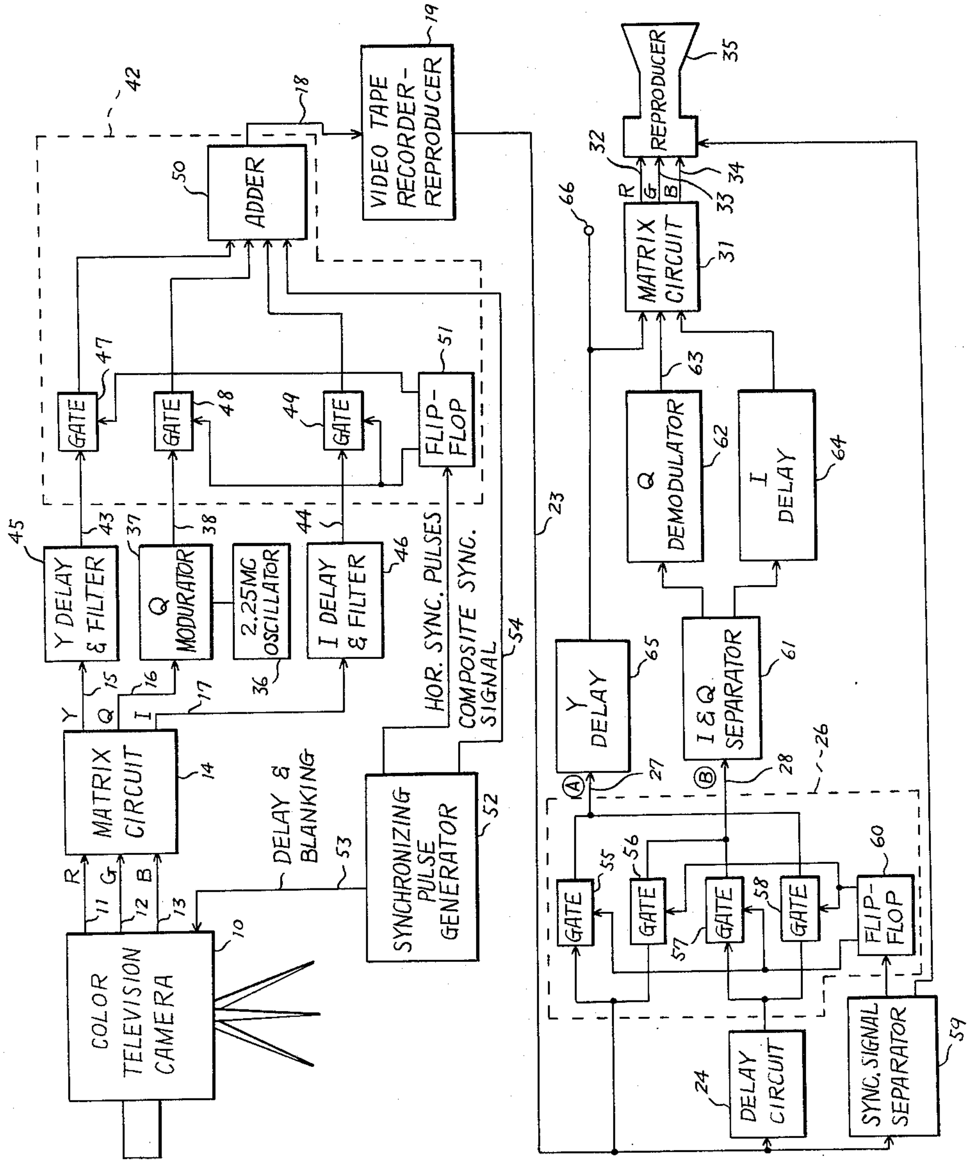
FIGURE 1 is a schematic diagram of a preferred form of signal transmission system constructed according to the principles of this invention, wherein color television signals are converted to a signal which is recorded on a video tape recorder-reproducer, then subsequently reproduced and converted to signals which are applied to a picture tube or reproducer.
Figure 2:
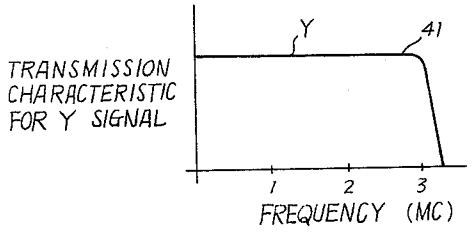
FIGURE 2 is a graph showing the transmission characteristics and band width requirements for transmission of a Y signal.

In brief, the illustrated system comprises a conventional color television camera 10 which produces red, green and blue color signals on lines 11, 12 and 13. These signals are applied to a matrix circuit 14 which develops a black-and-white or luminance signal Y on a line 15 and chrominance signals Q and I on lines 16 and 17. The Y, Q and I signals are applied through filter, modulator and switching circuits to ultimately produce a composite video signal on a line 18 which is applied to a video tape recorder-reproducer 19. The video signal which is recorded may have a waveform such as designated by reference numeral 20 in FIGURE 4. As diagrammatically shown, horizontal synchronizing pulses 21 on blanking pedestals 22 are generated periodically at a line rate (15,750 per second) and the video signal appears therebetween. The video signal is of a line-sequential type. During one line the luminance or Y signal is transmitted and then during the next line of the same field, a composite chrominance signal having I and Q components is transmitted, after which the Y signal is transmitted in the next line of the same field, etc.

The recorded video signal may then be reproduced and applied through a line 23 to the reproducing portion of the system. This signal is applied to a delay circuit 24 arranged to produce a delay time exactly equal to the duration of one line, for example 63.5 microseconds. The waveform of the delayed signal is indicated by reference numeral 25 in FIGURE 4. The delayed video signal, together with the undelayed signal are applied to a switching circuit 26 having "A" and "B" outputs at lines 27 and 28. This circuit operates to apply to the A output on line 27 the Y signal during one horizontal line and the delayed Y signal, designated by Y', during the next horizontal line of the same field, then the undelayed Y signal during the next following horizontal line of the same field, etc. This output thus has a waveform as indicated by reference numeral 29 in FIGURE 4. Reference numeral 30 indicates the waveform produced at the B output line 28, which comprises a delayed chrominance signal, designated by I' plus Q', developed during one horizontal line and an undelayed chrominance signal, I plus Q generated during the next horizontal line of the same field.

The composite chrominance signal is then separated into its I and Q components, the Q component is demodulated and the thus-generated Y, Q and I signals are applied to a matrix circuit 31 which develops red, green and blue color signals on lines 32, 33 and 34, such color signals being applied to a reproducer 35.

Before entering into a more detailed description of the system, it is believed that it will be helpful to explain the system as approved by the National Television System Committee and the Federal Communications Commission. In the approved system, the luminance signal Y and chrominance signals I and Q are properly composed to become a color signal. Picture contents of two adjacent scanning lines of the same field in a color picture as reproduced on a color picture tube are almost the same, as if composed by the same color signal and even if the two scanning lines are modulated by the same color signal, any difference cannot be recognized. This is especially true when the number of the scanning lines is increased in one frame. Therefore, it will be apparent that if one scanning line is formed by signals including a luminance signal Y and the chrominance signals of one preceding scanning line of the same field (referred to as I' and Q') and the next scanning line is formed by signals including a luminance signal Y of one preceding scanning line of the same field (referred to as Y') and the chrominance signal, so as to produce a sequence $$Y+(I'+Q')\ \ldots\ Y'+(I+Q)\ \ldots\ Y+\text{A}I'+Q')\ \ldots$$

a faithful picture may be reproduced.

In order to obtain such a signal sequence, it is necessary to pick up the luminance signal Y and the chrominance signal $(I+Q)$ alternated at every other scanning line period, namely in the line sequence from the original color signal and to delay the signals by one scanning line period alternately in such a way that a luminance signal in which the Y signal and Y' signal are sequentially alternated at every other scanning line period and a chrominance signal in which the $I+Q$ signal and $I'+Q'$ signal are successively alternated at every other scanning line period. Since the Y and $(I+Q)$ signals are made line-sequential, there is no need for any frequency interlock of the $(I+Q)$ signal in the Y signal spectrum and there is no need for using the synchronizing burst signal. Accordingly, the frequency spectrum or band width is made so narrow that a vivid picture may be reproduced without color aberration.

Figure 3:
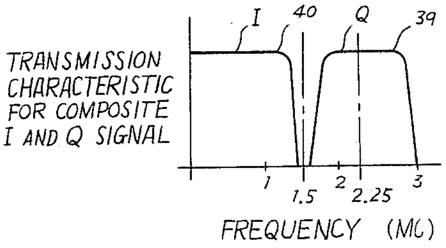
FIGURE 3 is a graph similar to FIGURE 2 showing the transmission characteristics for transmission of a composite I and Q signals.

It is generally considered sufficient for the chrominance signals I and Q to have frequency band widths of 1.5 megacycles and 0.5 megacycle respectively. According to an important feature of the invention, a carrier signal of 2.25 megacycles produced by an oscillator 36 is modulated by the Q signal on line 16 by a modulator 37 to produce a modulated signal on a line 38. The modulated signal produced on line 38 may have a frequency spectrum as indicated diagrammatically by reference numeral 39 in FIGURE 3, to extend from approximately 1.5 to 3 megacycles. The frequency spectrum of the I signal is indicated diagrammatically by reference numeral 40 in FIGURE 3 and may be below 1.5 megacycles as shown, so that both signals may be transmitted in a common channel, without exceeding a total band width requirement of 3 megacycles. The band width requirement for the luminance signal Y is generally considered to be 4 megacycles, but it can be reduced to about 3 megacycles without appreciably affecting quality, and its spectrum may have a form as indicated by reference numeral 41. Accordingly, the band width requirement for the luminance signal Y may correspond with the band width requirement for the composite chrominance I and Q signals.

The modulated Q signal on line 38 is applied to a switching circuit 42 along with Y and I signals on lines 43 and 44. Lines 43 and 44 are connected through circuits 45 and 46 to the matrix output lines 15 and 17. Circuits 45 and 46 may provide delays to compensate or balance delays produced in the modulator 37 and may also include suitable band-pass filters.

The switching circuit 42 may take various forms but may preferably comprise three gate circuits 47, 48 and 49 connected between the input lines 43, 38 and 44 respectively, and an adder circuit 50 having its output connected to the line 18. The gate 47 is connected to one output of a flip-flop circuit 51 while the gates 48 and 49 are connected together and to the other output of the flip-flop 51. The flip-flop 51 is triggered by horizontal synchronizing pulses from a synchronizing pulse generator 52. In response to one horizontal synchronizing pulse, the flip-flop 51 may be triggered in one direction to open or enable the gate 47 while closing gates 48 and 49 to develop only the luminance signal Y at the output of adder 50. In response to the next horizontal synchronizing pulse, the flip-flop 51 is triggered in the opposite direction to enable the gates 48 and 49 while closing gate 47 to thereby develop a composite I and Q chrominance signal at the output of the adder circuit 50.

The synchronizing pulse generator applies horizontal and vertical drive and blanking pulses to the camera 10 through a line 53 and also applies a composite synchronizing signal to the adder circuit 50 through a line 54. This composite signal, may of course, include the horizontal synchronizing pulses, vertical synchronizing pulses and equalizing pulses in conventional fashion.

Figure 4:
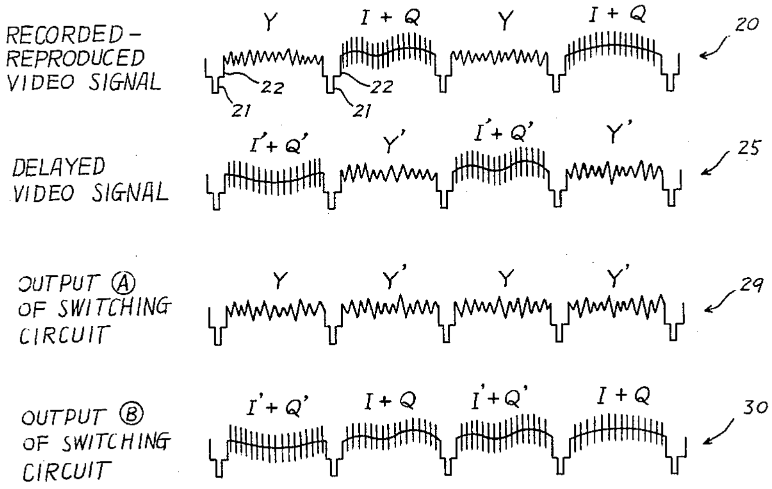
FIGURE 4 is a diagrammatic graphical illustration of the waveforms of video signals produced at various points in the system.

It will thus be appreciated that the line-sequential signal having the form $$Y\ \ldots\ (I+Q)\ \ldots\ Y\ \ldots\ (I+Q)\ \ldots\ Y\ \ldots$$

is produced at the output line 18, with a waveform as indicated diagrammatically by reference numeral 20 in FIGURE 4, and is applied to the video tape recorder-reproducer 19.

After the video signal is recorded, it is subsequently reproduced by the recorder-reproducer 19, or by a separate reproducer, and is applied through the line 23 to the reproducing section shown in the lower portion of FIGURE 1. As above described, this section comprises the delay circuit 24, which produces a time delay equal to the duration of one scanning line, and the switching circuit 26. Circuit 26 may take various forms but may preferably comprise a first pair of gate circuits 55 and 56 and a second pair of gate circuits 57 and 58. Each set of gates may be considered as forming the equivalent of a conventional switch having two contact points which may be selectively engaged by a movable contact point. Such switching devices are controlled by a synchronizing signal from a synchronizing signal separator 59 connected to the line 23. In particular, a flip-flop 60 may be triggered by horizontal synchronizing pulses from the separator 59 and may have one output connected to gates 55 and 57 and a second output connected to gates 56 and 58. When flip-flop 60 is triggered by one horizontal synchronizing pulse, gates 55 and 57 may be opened or enabled while gates 56 and 58 are closed, to develop at the A output on line 27 the luminance signal Y while developing a delayed composite chrominance signal $I'+Q'$ at output B on line 28. In response to the next horizontal synchronizing pulse, the flip-flop 60 may be triggered in the opposite direction to enable gates 56 and 58 while closing gates 55 and 57, to thereby develop a delayed signal Y' at the A output on line 27, while developing the undelayed $I+Q$ signal at the B output on line 28.

Outputs are thus produced at the A and B outputs on lines 27 and 28, such as indicated diagrammatically by the waveforms 29 and 30 in FIGURE 4.

The composite chrominance signal developed at output B on line 28 is applied to a separator circuit 61 which may comprise, for example, a first band-pass filter arranged to pass frequencies from 1.5 to 3 megacycles and a second bandpass or low-pass filter arranged to transmit signals from 0 to 1.5 megacycles. The modulated Q signal output of the separator 61 is applied to a demodulator 62, the output thereof being applied to the matrix circuit through a line 63. The demodulator 62 may be quite simple and may comprise, for example, a simple diode detector circuit.

The I signal output of the separator 61 is applied through a delay circuit 64 to another input of the matrix circuit 31 and the A output signal developed at line 27 is applied through a delay circuit 65 to a third input to the matrix circuit 31. Delay circuits 64 and 65 provide suitable delays to compensate or balance for delays produced in the demodulator and separator circuits.

As above indicated, the matrix circuit 31 may produce red, green and blue color signals which are applied through lines 32–34 to the reproducer 35. Horizontal and vertical synchronizing signals may also be applied to the reproducer 35 from the synchronizing signal separator 59.

It will thus be appreciated that with this invention, there is no transmission of a complete color signal such as approved by the National Television System Committee and the Federal Communications Commission so that delays such as produced by jitter in the recording and reproducing device do not affect the chrominance signal and there is no color aberration. At the same time, signals of the approved type can be readily recorded and reproduced.

Moreover, it is noted that a picture may be easily reproduced on a black and white picture tube, by connecting the video input thereof to a terminal 66 connected through the delay circuit 65 to the line 27, or directly to the line 27 if desired. If the system is to be used solely for obtaining a black and white picture from a recorded color signal, the elements 56, 57, 61, 62, 64, etc. are not necessary.

The term "chrominance signal" is used in the claims as referring to any signal relating to the chrominance value of a light image. The term is thus used in a broader sense than the term "carrier-chrominance signal" as defined at page 1–40 of Fink, Television Engineering Handbook, 1957, and is generic to the term "chrominance component" as defined at page 1–42 of Fink.

The terminology "continuous line-sequence signal" will be utilized in the claims to refer to a signal wherein a succession of lines related to a given image field are separated only by the usual horizontal retrace or blanking intervals, for example, without any gap equal to the time period of one scanning line. Of course as in the specific illustrated embodiment, each line of the continuous line-sequence signal may correspond to a line of only one of the Y signal and the composite I and Q signal so that the term comprehends, for example, a periodically occurring line sequence such as $$Y \ldots I+Q \ldots Y \ldots I+Q \ldots$$

as shown in the first part of FIGURE 4.

It will be understood that modifications and variations may be effected without departing from the spirit and scope of the novel concepts of this invention.

I claim as my invention:

1. A color signal recording and reproducing system comprising, in the recording system, means for producing a plurality of color signals, means comprising a matrix circuit for responding to said color signals to produce a luminance signal and a chrominance signal, means including switching means responding to the entire luminance signal and the entire chrominance signal alternately in line-sequence and providing only the entire luminance signal in one line interval both of the latter signals comprising together a continuous line-sequence color signal, and only the chrominance signal in the next line interval, and a magnetic recorder for recording said continuous line-sequence color signal;

and in the reproducing system, a magnetic reproducing device for reproducing said continuous line-sequence color signal recorded in said recording system, a delay circuit for delaying said continuous line-sequence color signal by one scanning line period thereby obtaining a delayed continuous line-sequence signal including a delayed luminance signal and a delayed chrominance signal, means including switching means for switching said continuous line-sequence color signal and said delayed continuous line-sequence signal and for providing a line-sequence luminance signal consisting of said luminance signal and said delayed luminance signal alternating in line-sequence and a line-sequence chrominance signal consisting of said chrominance signal and said delayed chrominance signal alternating in line-sequence, means comprising a matrix circuit for obtaining a plurality of color signals from said line-sequence luminance and chrominance signals, and means for reproducing a color picture from said color signals.

2. A color signal recording and reproducing system comprising, in the recording system, means for producing red, green and blue color signals, a matrix circuit for obtaining a luminance signal and two chrominance signals from said color signals, a source of a carrier signal having a frequency outside the range of frequencies of one of said chrominance signals, means for modulating said carrier signal with the other of said chrominance signals, thereby displacing the frequency band of said other of said chrominance signals with respect to the signal frequency band or said one of said chrominance signals in the frequency spectrum, means for responding simultaneously to said one chrominance signal and the modulated chrominance signal to form a composite chrominance signal and means for responding to said luminance signal and said composite chrominance signal alternately in line-sequence to provide a continuous line-sequence color signal, and a magnetic recorder for recording said continuous line-sequence color signal;

and in the reproducing system, a magnetic reproducing device for reproducing said continuous line-sequence color signal recorded in said recording system, a delay circuit for delaying one part of said continuous line-sequence signal by one scanning line period thereby obtaining a delayed continuous line-sequence color signal consisting of delayed luminance and delayed composite chrominance signals, switching means consisting of two sections one of which is for switching said continuous line-sequence color signal and the other of which is for switching said delayed continuous line-sequence color signal, said switching means having two output terminals at one of which a continuous line-sequence luminance signal consisting of said luminance signal and said delayed luminance signal alternating in line-sequence is obtained and at the other of which a continuous line-sequence composite chrominance signal consisting of said composite chrominance signal and said delayed composite chrominance signal alternating in line-sequence is obtained, a separator for separating said continuous line-sequence composite chrominance signal to obtain a first chrominance signal and a second modulated chrominance signal which are substantially the same as those obtained in the recording system, a demodulator for demodulating said second modulated chrominance signal to obtain a second demodulated continuous line-sequence chrominance signal, a matrix circuit for producing red, green and blue color signals from said continuous line-sequence luminance signal and said first and second chrominance signals, and a color picture tube for producing a color picture from said red, green and blue color signals.

3. A color signal recording system comprising means having a plurality of color signal outputs, means responsive to said color signal outputs for producing a luminance signal corresponding to brightness of a scene and a chrominance signal corresponding to the chromaticity of the image, means for gating the entire luminance signal and the entire chrominance signal alternately in continuous time sequence and providing only the entire luminace signal in one line interval and only the chrominance signal in the next line interval, and a magnetic recorder connected to said gating means.

4. A color signal reproducing system comprising a magnetic reproducer having only a luminance signal in one line interval and only a chrominance signal in the next line interval, a delay circuit connected to said magnetic reproducer output, a first pair of gates connected to said magnetic reproducer output, a second pair of gates connected directly to an output of said delay circuit, means for triggering one gate of each of said first and second pairs of gates to produce an output including the entire luminance signal in each line interval and for triggering the other gate of each of said first and second pairs of gates to produce an output including the entire chrominance signal in each line interval, and means responsive to said luminance signal and said chrominance signal for deriving a plurality of independent color signals.

5. A color signal recording and reproducing system comprising a television camera having a plurality of independent color signal outputs, means responsive to said color signal outputs for producing a luminance signal and a chrominance signal, means for gating the entire luminance signal and the entire chrominance signal alternately in line-sequence and providing only the entire luminance signal in one line interval and only the chrominance signal in the next line interval, a magnetic recorder and reproducer connected to said gating means and having a continuous line-sequence color signal output, a delay circuit connected to said continuous line-sequence color signal output, means for gating said continuous line-sequence color signal output and an output of said delay circuit in continuous time sequence with respect to one another to provide a first output including a luminance signal and a second output including a chrominance signal, and means responsive to said luminance signal and said chrominance signal for deriving a plurality of color signals each corresponding to a respective one of the plurality of independent color signal outputs.

6. An image signal recording system comprising means for providing a first signal component generated in accordance with the scanning of an image area and having a relatively wide frequency spectrum and comprising a first series of periodically occurring signals each having a time period which is small in comparison with the time period for scanning of the image area and for providing second and third signal components generated in accordance with the scanning of the image area and having respective relatively narrower frequency spectrums which overlap each other and overlap the frequency spectrum of said first signal component and comprising second and third series of periodically occurring signals each having the same time period as said first series of periodically occurring signals, means for displacing the frequency spectrum of one only of said second and third signal components to provide a displaced frequency spectrum lying immediately above the frequency spectrum of the other of said first and second signal components, means for combining at least every second one of the periodically occurring signals of said one of said second and third signal components with respective periodically occurring signals of said other of said second and third signal components to provide a composite signal component comprising a series of composite signals having a frequency spectrum substantially overlapping the frequency spectrum of the first signal component and for transmitting at least spaced composite signals of the composite signal component which are separated by a one line time period and for transmitting at least periodically occurring signals of the first signal component which are separated by a one line time period and which alternate in time with said spaced composite signal of the composite signal component.

7. A color signal recording system comprising a color television camera for producing a plurality of color signals, means for receiving said color signals and for producing a Y signal component, an I signal component and a Q signal component each comprising a succession of periodically occurring signals containing information with respect to the image viewed by said color television camera, means for receiving said Y signal component, said I signal component and said Q signal component from said receiving means and for modifying one of the I and Q signal components so as to enable the combining of corresponding periodically occurring signals of the one of said I and Q signal components and the other of said I and Q signal components, and including switching means for transmitting alternately a periodically occurring signal of the entire Y signal component and then a periodically occurring signal of the entire I and Q signal components to provide an output signal comprising a succession of composite signals which alternately contain only the Y signal information in one line interval and only the combined I and Q signal information of the color image viewed by said color television camera in the next line interval, and a magnetic recorder for receiving said output signal and for recording said output signal on a magnetic record medium.

8. A color signal reproducing system comprising a magnetic recording device for reproducing a color signal consisting of a succession of composite signals which alternately contain only the Y signal information in one line interval and only the combined I and Q signal information in the next line interval with respect to a color image, a delay circuit for delaying said color signal by one scanning line period thereby obtaining a delayed color signal including delayed entire Y signal component and a delayed entire I and Q signal component, means including switching means for switching said color signal and said delayed color signal and for providing a first output signal consisting alternately of a signal of the entire Y signal component in one line interval and then a signal of the delayed entire Y signal component in the next line interval and for providing a second output signal consisting of a signal of the delayed entire I and Q signal component in the one line interval and then a signal of the entire I and Q signal component in the next line interval, and means comprising a matrix circuit for receiving said first and second output signals and for providing a plurality of color signals therefrom.

References Cited by the Examiner

UNITED STATES PATENTS

| | | | |
|---|---|---|---|
| 2,736,762 | 2/1956 | Kell | 178—5.4 |
| 2,921,124 | 1/1960 | Graham | 178—6 |
| 2,960,563 | 11/1960 | Anderson | 178—5.4 |
| 2,993,086 | 7/1961 | De France | 178—5.2 |
| 3,048,652 | 8/1962 | Newell | 178—5.2 |

DAVID G. REDINBAUGH, *Primary Examiner.*

J. A. O'BRIEN, *Assistant Examiner.*